United States Patent
Carey et al.

(10) Patent No.: US 6,421,658 B1
(45) Date of Patent: Jul. 16, 2002

(54) EFFICIENT IMPLEMENTATION OF TYPED VIEW HIERARCHIES FOR ORDBMS

(75) Inventors: Michael J. Carey; George Lapis; Mir Hamid Pirahesh, all of San Jose, CA (US); Serge P. Rielau, Ajax (CA); Bennet Vance, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,590

(22) Filed: Jul. 30, 1999

(51) Int. Cl.[7] .............................................. G06F 17/30
(52) U.S. Cl. ....................... 707/2; 707/1; 707/5; 707/3; 707/10; 707/104
(58) Field of Search ................. 707/3, 104, 5, 707/2, 10, 1; 207/1–3, 10, 5

(56) References Cited

U.S. PATENT DOCUMENTS

| | | | | |
|---|---|---|---|---|
| 5,291,583 A | | 3/1994 | Bapat ......................... 707/103 |
| 5,295,256 A | | 3/1994 | Bapat ......................... 707/103 |
| 5,295,261 A | | 3/1994 | Simonetti ................... 707/201 |
| 5,317,742 A | * | 5/1994 | Bapat ......................... 707/103 |
| 5,418,943 A | * | 5/1995 | Borgida et al. ............. 707/104 |
| 5,584,024 A | * | 12/1996 | Shwartz ...................... 707/100 |
| 5,680,619 A | | 10/1997 | Gudmundson et al. ..... 707/200 |
| 5,694,598 A | | 12/1997 | Durand et al. ........... 707/103 R |
| 5,724,575 A | * | 3/1998 | Hoover et al. .............. 707/104 |
| 5,829,006 A | | 10/1998 | Parvathaneny et al. ..... 707/101 |
| 5,838,965 A | | 11/1998 | Kavanagh et al. ....... 707/103 R |
| 5,850,544 A | | 12/1998 | Paryathaneny et al. ..... 707/101 |
| 6,122,627 A | * | 9/2000 | Carey et al. ................... 707/4 |

OTHER PUBLICATIONS

M. Arikawa (1991) "A View Environment to Reuse Class Hierarchies in an Object–Oriented Database System," Database Systems for Advanced Applications '91 2:259–268.

* cited by examiner

Primary Examiner—Jean M. Corrielus
Assistant Examiner—Cam-Y Truong
(74) Attorney, Agent, or Firm—Gates & Cooper LLP

(57) ABSTRACT

A method for typed view hierarchies for an object-relational database management (OPDBMS). The views in the hierarchy are merged into a unified hierarchy view through case expressions for mapping and wrapping of overloaded columns. During the merge, the underlying logical tables are eliminated which results in a simplified query graph. The transformation is a non-loss operation which condenses the type information within the case expressions. This allows update, delete and insert operations to be resolved on the query graph on a local level. Using query rewrite rules, the case expressions may be simplified further.

19 Claims, 6 Drawing Sheets

| TYPE CODE | OID | NAME | SALARY | DEPT | MAJOR |
|---|---|---|---|---|---|
| Person | | | | | |
| Person | | | | | |
| ... | | | | | |
| Person | | | Null | | |
| Employee | | | | | |
| ... | | | | | |
| Employee | | | | Null | |
| Manager | | | | | |
| Manager | | | | | |
| ... | | | | | |
| Manager | | | | | Null |
| Student | | | | | |
| Student | | | | | |
| ... | | | | | |
| Student | | | | Null | |

FIG. 1(b)

EFFICIENT IMPLEMENTATION OF TYPED VIEW HIERARCHIES FOR ORDBMS

FIELD OF THE INVENTION

The present invention relates to relational database management systems, and more particularly to typed view hierarchies for an object-relational database management system (ORDBMS).

BACKGROUND OF THE INVENTION

More and more software applications are being written in object oriented languages such as C++ or Java. Over the past few years, object oriented database management systems (OODBMS) have been developed to serve this need. However, known object oriented database management systems do not provide the many features and the scalability of known is relational database management systems (RDBMS). In response to this need, vendors of relational database management systems have attempted to extend the functionality of their RDBMS products to capture the object oriented market. The result is an object-relational database management system (ORDBMS) which provides the application program with an object oriented view of its data while maintaining a relational treatment for queries and update operations.

The foundation of a relational database management system or RDBMS is a set of tables which hold the actual relational data. On top of the tables, the RDBMS provides a level of encapsulation known as "views". The purpose of the views is to provide different "views" on the same set of data for different groups of clients. The different views protect both the data from being seen by unauthorized groups and the clients from being overwhelmed by information that is not useful. In addition, views provide pre-processing of the raw data.

It will be appreciated that for object-oriented applications a uniform table is too flat. In a RDBMS, all objects within a table are of the same form, i.e. the objects appear as homogeneous rows. As a result, an application that pushes various types of objects into the DBMS will need to add more semantics and thus the overhead for storing the object as a row is increased. When the object is queried these semantics need to be analyzed again by the application in order to deduce the type of the object. One approach to handling the additional semantics is to store each type of object in a separate table. Alternatively, the table can be enriched with additional typecode columns that need to be analyzed. Either way queries on these objects cannot be optimized by the DBMS since the DBMS is not aware of the added semantics and the mapping done by the application. Furthermore, the mapping imposes a higher load of coding on the application. The problem of mapping object oriented data into the relational model is often referred to as "impedance mismatch".

The SQL standard now provides a facility for creating typed table hierarchies within the DBMS. The DB2 product available from IBM has realized this feature of pushing the mapping of different objects into rows of a physical table into the DBMS through the use of a so-called hierarchy table for a physical representation and through the generation of so-called logical tables serving as query targets on the table hierarchy to project and filter the rows in the hierarchy table to match the requested type. The SQL standard also now provides for a facility to expand the concept of views over tables to typed view hierarchies over typed table hierarchies.

Existing prior systems typically result in large access graphs having very poor performance. Essentially every object in the hierarchy is mapped without exploiting the meta information of the requested classes and the one stored in the structure of the hierarchies.

Accordingly, there still remains a need for enriching tables and views in a relational database management system with the concept of hierarchies and typed rows comprising classes and objects.

BRIEF SUMMARY OF THIS INVENTION

The present invention provides a method for defining an efficient representation for the complete hierarchy that can be shared by multiple references from different classes.

The method according to the invention features a dense implementation which allows subsequent query rewrite to eliminate all unneeded access to physical tables. Advantageously, this reduces the access to nearly the one chosen when not using the view at all. Moreover, this is transparent and scaleable. As a cookie, the present invention overcomes cheaply the hurdles of insert and updating through the hierarchies, which for a straight forward solution would be expensive.

According to the invention, all views in the hierarchy are merged into a hierarchy view through the use of case expressions for mapping of view types and wrapping of overloaded column. Advantageously during this procedure the underlying logical tables are eliminated which results in a more straight forward query graph. Since the transformation is a non-loss transformation and condenses the type information within the case-expressions, then update, delete and insert operations can be resolved in the graph on a local level. Query rewrite can simplify these case-expressions with well known general rules and this minimizes the query to the nearly optimal case by eliminating the case-expressions and using the resulting predicates to drop non accessed table hierarchy from the graph.

BRIEF SUMMARY OF THE DRAWINGS

Reference will now be made to the accompanying drawings which show, by way of example, preferred embodiments of the present invention and in which:

FIG. 1(b) shows the hierarchy table of FIG. 1(a) in more detail;

DETAILED DESCRIPTION OF THE PREFERRED EMBODIMENT

The present invention is described in the context of an object-relational database management system or ORDBMS, such the well-known DB2™ database program from IBM. The database management system comprises the combination of an appropriate central processing unit (i.e.

computer), direct access storage devices (DASD) or disk drives, and the database management software or program. It will however be appreciated that the invention is applicable to other types of relational database management systems.

Figure 1A:
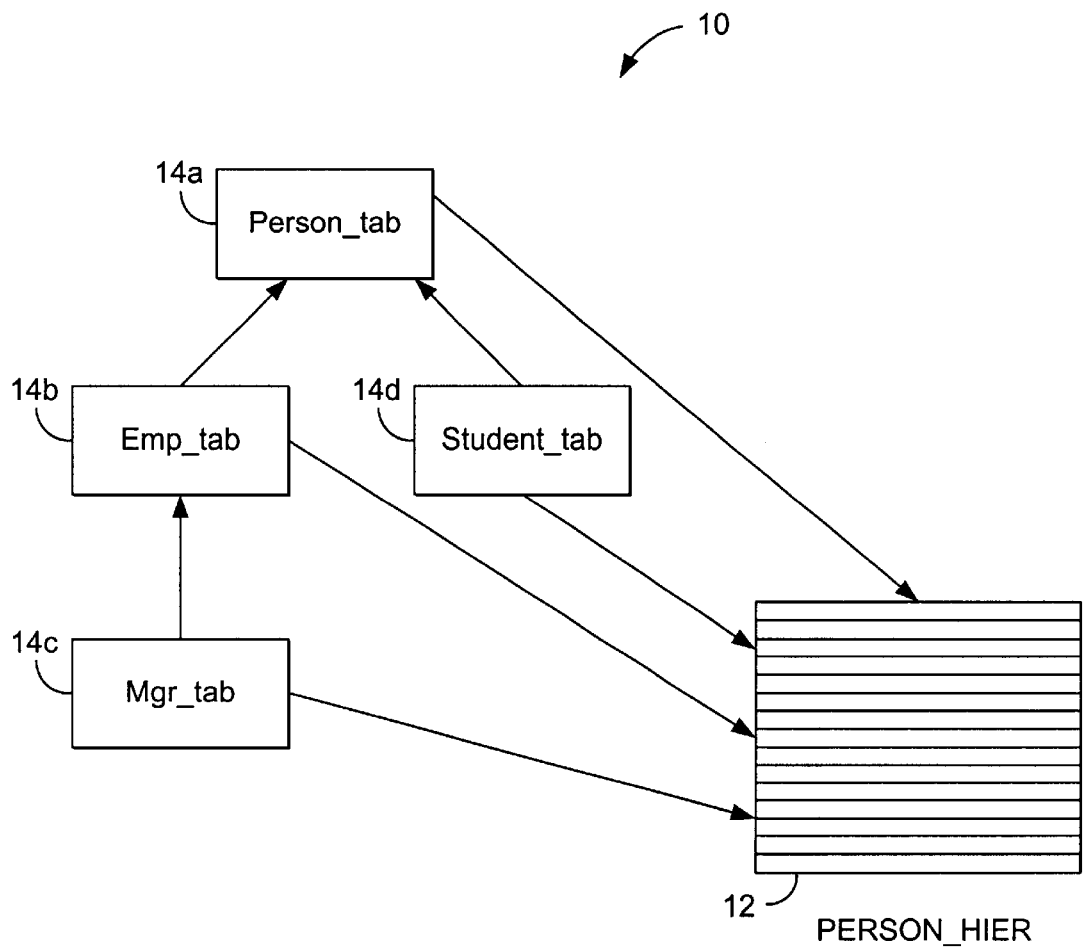
FIG. 1(a) shows in diagrammatic form a hierarchy table and a hierarchy of logical tables according to a first aspect of the present invention.

Reference is first made to FIG. 1(a) which shows in diagrammatic form a mechanism for typed tables in a relational database management system. The typed tables indicated generally by reference 10 comprise a hierarchy table 12 and a hierarchy of logical tables 14, indicated individually by 14a, 14b, 14c and 14d. The hierarchy table 12 as shown in FIGS. 1(a) and 1(b) comprises a physical data table containing all the columns that occur in all typed tables as represented by the logical tables 14.

As shown in FIG. 1(b), the hierarchy table 12 includes a typecode column indicated by 16 and object identifier (OID) column indicated by 18. The typecode column 16 is used to map a row to the proper type (i.e. table). The object identifier (OID) column 18 identifies the row uniquely within the table hierarchy as a distinct object.

As will now be described, the present invention provides an internal implementation for a view hierarchy defined by a user in an object-relational DBMS or ORDBMS.

The ORDBMS provides for the creation of typed object views, and these object views can either be root views or sub-views of other object views. The root view and its sub-views together form an object view hierarchy. A view hierarchy on a single table hierarchy is shown in FIG. 2 and described in more detail below A view hierarchy over a multiple table hierarchy is shown in FIG. 3 and also described in more detail below.

As will be described in more detail below with reference to examples, the object view hierarchy comprises the following features and attributes. The type used in a given object view definition is a structured type, just as in a typed table definition. The body of an object view definition is a SQL query, as is the case for regular views, but the select list of the query must be type-compatible with the declared type of the object view. As for a typed table, instances of object views have object id's, and the name of the object id column is specified in the view definition. The object id's are required to be unique within the view's object view hierarchy, and uniqueness is preferably checked at view definition time. Object views may contain references, just as base tables may, and the references must be scoped if they are to be de-referenced. The scope of a reference in an object view can be either an object view or a base table. For each object view in a view hierarchy, the body of the view or sub-view specifies how the objects that belong in that specific view or sub-view are to be obtained, i.e. each view/sub-view body tells the ORDBMS how to compute the contents of its particular virtual table within the overall hierarchy.

Figure 2:
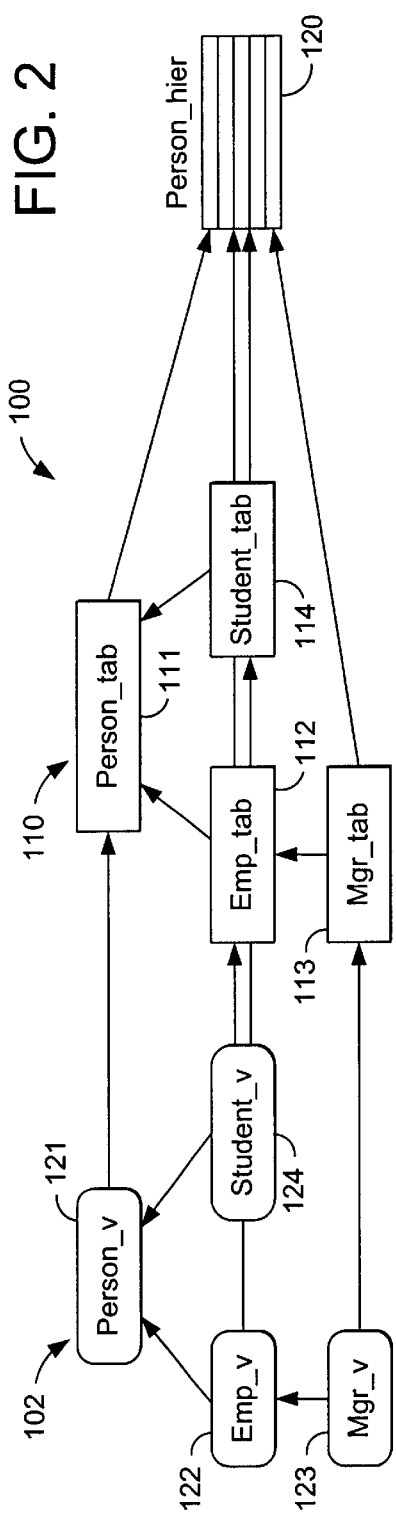
FIG. 2 shows in schematic form an object view hierarchy on a single table hierarchy.
Figure 3:
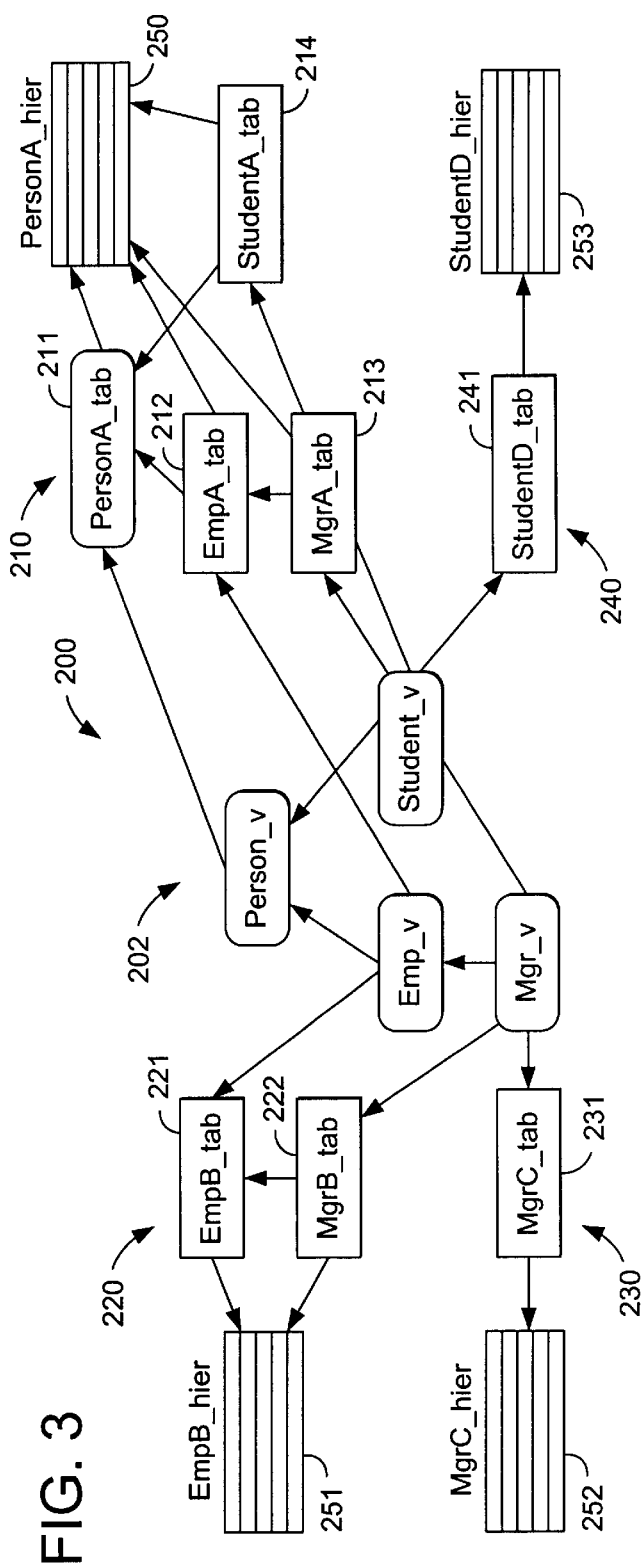
FIG. 3 shows in schematic form an object view hierarchy over multiple table hierarchies.

Reference is made to FIG. 2 which shows an object view hierarchy over a single table hierarchy 100. In a relational database management system, views are virtual tables whose contents are defined by a query. To a user's application or query, a view looks just like a table. The object view hierarchy is indicated generally by 102 and defined on a single table hierarchy 110 comprising a root table for persons 111, a sub-table for employees 112, a sub-table for managers 113 and a sub-table for students 114. The single table hierarchy 100 is defined by a user utilizing data definition language (DDL) statements in SQL for the ORDBMS having the following form;

(User) Create Table Type Hierarchy:
    CREATE TYPE person_t AS(name varchar(20), birthdate date) ref using integer;
    CREATE TYPE emp_t UNDER person_t AS(salary int, room char(4));
    CREATE TYPE mgr_t UNDER emp_t AS(dept varchar(20), bonus int);
    CREATE TYPE student_t UNDER person_t As(major varchar(20), grade char(1));

(User) Create Table Hierarchy:
    CREATE TABLE person OF person_t(REF IS oid USER GENERATED);
    CREATE TABLE emp OF emp_t UNDER person INHERIT SELECT PRIVILEGES;
    CREATE TABLE mgr OF mgr_t UNDER emp INHERIT SELECT PRIVILEGES;
    CREATE TABLE student OP student_t UNDER person INHERIT SELECT PRIVILEGES;

(User) Create View Type Hierarchy:
    CREATE TYPE person_vt As(name varchar(20)) ref using integer;
    CREATE TYPE emp_vt UNDER person_t AS(room char(4));
    CREATE TYPE mgr_vt UNDER emp_t AS(dept varchar(20));
    CREATE TYPE student_vt UNDER person_t AS(major varchar(20));

It will be appreciated that the types person_t, emp_t, mgr_t and student_t form a type hierarchy for modelling the various kinds of people of interest as given by this example. A subtype, e.g. emp_t, inherits all the attributes of its parent type, e.g. person_t. It will further be appreciated that types must exist before being referred to in a SQL statement. Furthermore, the optional clause "ref using Integer" in the statement that creates the root type person_t tells the ORDSMS to use integers as the internal representation type for references to objects of this type and its subtypes.

Internally in the ORDBMS, the table hierarchy 100 is defined by one physical table 120 or person_hier. The table 120 for person_hier holds all the columns plus the typecodes
    as described in FIG. 1(b). Columns which are non-existent in a given sub-table are set to NULL in the person_hier table 120 (as shown in FIG. 1(b)). The root table 111 and the sub-tables 112, 113, 114 are described by logical tables which are represented by views as follows:

Internal (hierarchy table);
    CREATE TABLE person_hier (typecode integer, oid integer, name varchar(20), birthday date, salary int, room char(4), dept varchar(20), bonus int, major varchar(20), grade char(1));

Internal (logical tables):
    CREATE VIEW ONLY(emp)(oid, name, birthdate, salary, room)
        AS SELECT emp_t(oid), name, birthdate, salary, room FROM person_hier
        WHERE typecode IN (emp_tcode);
    CREATE VIEW (emp)(oid, name, birthdate, salary, room)
        AS SELECT person_t(oid), name, birthdate, salary, room FROM person_hier
        WHERE typecode IN (emp_tcode, mgr_tcode, student_tcode);

When a typed table of the table hierarchy is referenced in a DMI statement (e.g. a select query), the system generates a fitting query target, i.e. logical table, that will fit the queried typed table as illustrated by the following examples:

SELECT*FROM ONLY(EMP),
CREATE VIEW emponly_qtarget(oid, . . . );
SELECT*FROM EMP:
CREATE VIEW emp_qtarget(oid, . . . );

To build the object view hierarchy 102, the ORDEMS is provided with a "create view" DDL statement in SQL. The user specifies the object view hierarchy 102 as follows:
(User) Create View Hierarchy:

CREATE VIEW person_v OF person_vt(REP IS oid USER GENERATED)
   AS SELECT person_vt(int(oid)), name FROM ONLY (person);
CREATE VIEW emp_v OF emp_vt UNDER person_v
   INHERIT SELECT PRIVILEGES
   AS SELECT emp_vt(int(oid)), name, room FROM ONLY(emp);
CREATE VIEW mgr_v OF mgr_vt UNDER emp_v
   INHERIT SELECT PRIVILEGES
   AS SELECT mgr_vt(int(oid)), name, room, dept FROM ONLY(mgr);
CREATE VIEW student_v OF student_vt UNDER person_v
   INHERIT SELECT PRIVILEGES
   AS SELECT student_vt(int oid)) name, major FROM ONLY(student);

For the object view hierarchy 102, the first statement creates an object view 121 person_v of type person_vt with an object id column named oid. The body of the view tells the ORDBMS how to derive the extent of the view (including the object id values for the view objects). In this case, the SQL query that forms the body selects the oid and name columns from the person base table. The next three statements create the person_v view hierarchy. The second create view statement shown above creates an object view emp_v (shown as 122 in FIG. 2), of type emp_vt, In the body of the statement, the use of the ONLY keyword in the FROM clause (which can be used in most any SQL query in the DB2™ database program) instructs the ORDBMS to exclude sub-table rows from consideration. It is essentially a convenient shorthand for the equivalent type predicate and the object view emp_v will contain rows that are derived exactly from the emp_table. Similarly, the third create view statement creates an object view mgr_v(shown as 123 in FIG. 2), and the fourth create view statement creates an object view student_v (shown as 124 in FIG. 2).

For the DB2™ database program, in particular, the object ids in the object views are unique within their view hierarchy. In the case of the person_v hierarchy, this means that the database program checks (i) that the derivation of the oid column of emp_v is duplicate free, (ii) that the derivation of the oid column of mgr_v is duplicate free, (iii) that the derivation of the oid column of student_v is duplicate free, and (iv) that oid's are still unique across these views when considered together. In the context of the present invention, it is assumed that OID uniqueness is given.

Once defined by the user, object views can be used in queries, including path queries. The object views can also be updated if the defining SELECT statements are of an updatable nature.

Internally in the ORDBMS, the rows of all views/subviews in a given object view hierarchy reside together in a single implementation view that is referred to as a hierarchy view or H-view. Although the H-view is not materialized as a physical entity, logically the H-view behaves similarly to a hierarchy table. Advantageously, this implementation allows most of the DB2™ query compiler code that deals with query and update operations on table hierarchies, translating them into corresponding H-table queries and updates internally, to be reused for operations on object view hierarchies according to the present invention. For example, when a user operates on a table in the person_v hierarchy 102 (FIG. 2), the ORDSMS (e.g. DB2™) is configured to internally translate the user's query into operations on temporary views that are based on the hierarchy's H-view. The generation of these internal views in DB2™ according to the invention is now described in greater detail.

According to this aspect of the invention, all object views in the hierarchy are merged into one view using case expressions for mapping and wrapping of overloaded columns. For the object view hierarchy 102 of FIG. 2, the case expression for the typecode mapping is as follows:
MAP(person_hier.typecode):

SELECT CASE WREN typecode IN (person_tcode) AND person_where
   THEN person_vcode
WHEN typecode IN (emp_tcode) AND emp_where
   THEN emp_vcode
WHEN typecode IN (mgr_code) AND mgr_where
   THEN mgr_vcode
WHEN typecode IN(student_tcode) AND exec_where
   THEN studejt_vcode END
AS typecode
FROM VALUES(1);
CREATE VIEW person_v hier (typecode, oid, name, room, dept, major)
   As SELECT map.typecode, oid-expr,
     CASE WHEN map.typecode IN ($vc_1, \ldots, vc_n$)
       THEN name-expr$_1$
     WHEN map. typecode IN ($vc_{n+1}, \ldots, vc_m$)
       THEN name-expr$_2$ END,
. . .
FROM person_hier, map(person_hier.typecode);

The view person_vhier contains a Case expression that is a wrapper in the select-list, i.e. namely the one for the name-column. The MALP query is the case expression which describes the type mapping.

It will be appreciated that the above representation for the view hierarchy provides the following advantages: (1) the representation of the view hierarchy is compact—the amount of Computations necessary for the view encapsulation is limited to the dispatch and mapping of typecodes and expressions. The latter of which can actually be removed by query rewrite in the common simple case. (2) the representation of the view hierarchy is free of the UNION ALL SQL statements, which means each row only has to be touched once. This makes access more efficient. (3) the representation allows data updates and inserts to be performed through analysis of case expressions only.

The representation of the view hierarchy according to the invention also accommodates existing relational, i.e. nonobject, tables. Advantageously, this provides a migration path for users who have legacy relational data (i.e. existing data which non-object oriented), and wish to begin exploiting object-relational modelling for developing new applications. For example, an existing university database includes a pair of relational tables, emp_t and dept_t. The structure of the emp_t table is (eno, name, salary, deptno) and the structure of the dept_t table is (dno, name, mgrno), where the columns eno and dno are integer keys and the columns "mgrno" and "deptno" are corresponding foreign keys. The object views for the stored data in the legacy database is created using the following DDL SQL statements:

```
CREATE VIEW dept_v of dept_vt(REF IS oid USER GENERATED)
    AS SELECT salary, name, emp_vt(mgrno)
        FROM dept;
CREATE VIEW person_v of person_vt(REF IS oid USER GENERATED)
    AS SELECT person_vt(eno), name
        FROM emp
        WHERE salary is null;
CREATE VIEW emp_v of emp_vt UNDER person_v
    INHERIT SELECT PRIVILEGES
    AS SELECT emp_vt(eno), name, salary
        FROM emp
        WHERE salary <100000;
ALTER VIEW dept_v ALTER COLUMN mgr ADD SCOPE emp_v;
```

In the above object view hierarchy for person_v, rows in the emp_v table with null salary values represent regular people, while rows with non-null salaries under $100,000 represent the employees that are to be made visible through the definition for the view emp_v. It will be appreciated that the object id's for the object views are derived from the primary keys of the legacy tables. Once the DDL statements are executed, the resulting dept_v and person_v view hierarchies will have the same behaviour in subsequent queries as the object views described above.

When a user operates on a table in the person_v hierarchy, ORDBMS (e.g. DB2™) internally translates the user's query into operations on temporary views for the view hierarchy, and having the following form. (These operations are based on the hierarchy's H-view.)

```
Map (emp.salary)
    (Internal) CREATE VIEW emp_with_type_ids(type_id, eno, name, salary)
        SELECT CASE WHEN salary IS NULL THEN 3100
            WHEN salary 100000 THEN 3200
            END as type_id,
    (Internal) CREATE VIEW personv_hview(type_id, oid, name, salary)
        AS SELECT type_id, eno,
            CASE WHEN type_id IN (3100, 3200) THEN name
                ELSE NULL END,
            CASE WHEN type_id IN (3200) THEN salary
                ELSE NULL END
        FROM emp,map(emp.salary) WHERE type_id IS NOT FULL
```

The first view is the view emp_with_type_ids, which pre-pends one extra column, type_id, to rows of the legacy table (emp) upon which the user's view hierarchy was defined above. The purpose of the type_id column is to distinguish among legacy emp rows based on whether they should appear in the view person_v, the view emp_v or neither. This is done by attaching a type_id to each row which identifies its corresponding structured type (i.e. based on the user's view definitions) within the object view hierarchy. The case expression in the body of the emp_with_type_ids returns the value 3100 when the employee's salary is null, thereby classifying an emp row as belonging to the object view of type person_vt (i.e. person_v) if it satisfies the predicate provided in the user's view definition for the view person_v. Similarly, the second branch of the case expression is based on the predicate of the view emp_v, associating emp_vt's type id (3200) with those rows in emp_that satisfy the emp_v predicate. If neither branch of the case expression is satisfied, then the resulting type id will be null. This is appropriate as rows that satisfy neither predicate should appear in neither of the hierarchy's object views and a null type id will disqualify such rows from both.

The second internal view person_hview as shown above is the hierarchy view or H-view. The purpose of this view is to provide the view-equivalent of an H-table. As such, the person_v: hview has the union of the columns required to represent a row for any view/sub-view in the hierarchy. Root-level columns of person_hview can be selected directly from the view emp_with_type_ids, while sub-view columns (in this case the dept column for the sub-view emp_v) must be NULL for the rows that are not part of their sub-view of the hierarchy. In general, a column introduced by a sub-view must be NULL in all rows pertaining to superviews. Since a sub-view may have "sibling" views, it is necessary to make sure that the column is NULL in all views except those in the sub-hierarchy rooted at the sub-view that introduced the column in question. As shown above, the body of the view person_hview includes a case expression that computes its dept column. It will be appreciated that the case expression not only discriminates between NULL and non-NULL cases, but also among the different expressions that apply for computing the column value for a given row.

In addition to the hidden temporary views, the ORDBMS generates an internal realization of possible object view query targets having the following form:

```
INTERNAL VIEW vperson_qtarget (oid, name)
    (REF IS oid USER GENERATED)
    AS SELECT person_vt(eno), name
        FROM personv_hview
        WHERE type_id IN (3100, 3200);
INTERNAL VIEW vemp_qtarget OF emp_vt UNDER person_v
    (dept WITH OPTIONS SCOPE dept_v)
    AS SELECT emp_vt(eno), name, dept
        FROM personv_hview
        WHERE type_id IN (3200);
```

The headers, i.e. "Interfaces", of these internal views are identical to those of the user's view definitions, but the bodies have been reformulated in terms of the hierarchy view. The changes to the view body are that (i) the columns are taken verbatim from the H-view (except for oid caste), and (ii) filtering of rows is now done via the computed type id,s rather than via the user's original predicates since the type id's themselves were computed based on the user's predicates. It is to be appreciated that while the above described object view hierarchy is described for a legacy database, the implementation details are the same for object views on object tables or for object views upon object views upon object views.

Reference is next made to FIG. 3 which shows an object view hierarchy over multiple table hierarchies 200. The object view hierarchy is indicated generally by 202 and is defined on four table hierarchies 210, 220, 230 and 240. The first table hierarchy 210 comprises a root table for persons 211, a sub-table for employees 212, a sub-table for managers 213 and a sub-table for students 214. The second table hierarchy 220 comprises a root table for other employees 221 and a sub-table for managers 222. The third table hierarchy 230 comprises a single root table for managers 231, and the fourth table hierarchy 240 comprises a single root table 241 for students. The table hierarchies 210, 220, 230 and 240 are defined by a user utilizing data definition language (DDL) statements as follows;

(User) Create Table Hierarchy A (Covers the whole previous hierarchy):
  CREATE TABLE person_a OF person_t (REF IS oid USER GENERATED);
  CREATE TABLE emp_a OF emp_t UNDER person_a INHERIT SELECT PRIVILEGES;
  CREATE TABLE mgr_a OF mgr_t UNDER emp_a INHERIT SELECT PRIVILEGES;
  CREATE TABLE student_a OF student_t UNDER person_a INHERIT SELECT PRIVILEGES;
(User) Create Table Hierarchy B (Missing the students and persons).
  CREATE TABLE emp_b OF emp_t (REF IS oid USER GENERATED);
  CREATE TABLE mgr_b OF mgr_t UNDER emp_b INHERIT SELECT PRIVILEGES;
(User) Create Table Hierarchy C (only managers):
  CREATE TABLE mgr_c OF mgr_t (REF IS oid USER GENERATED);
(User) Create Table Hierarchy D (only students):
  CREATE TABLE student_d OF student_t (REF IS oid USER GENERATED);

This example shows how each of the user defined sub-views can be merged into a single hierarchy view consisting of as many UNION ALL branches as there are physical hierarchy tables. The merging is performed by type mapping using case expressions.

Internally in the ORDBMS, the table hierarchies 200 are defined by four physical tables 250, 251, 252 and 253. The first physical table 250 or PersonA_hier is for persons. The second physical table 251 or EmpB_hier is for employees. The third physical table 252 or MgrC_hier is for managers and the fourth physical table 253 or StudentD_hier is for students.

Next the object view hierarchy 202 matching the objects from the different branches is built using the "create views" statement (as described above) and shown below:
(User) Create view Hierarchy:
  CREATE VIEW person_v OF person_vt(REF IS oid USER GENERATED UNCHECKED)
    AS (SELECT person_vt(integer(oid)), name FROM ONLY(person_a);
  CREATE VIEW emp_v OF emp_vt UNDER person_v INHERIT SELECT PRIVILEGES
    AS (SELECT emp_vt(integer(oid)), name, room FROM ONLY(emp_a))
    UNION ALL
    (SELECT emp_vt(integer(oid)), name, room FROM ONLY(emp_b));
  CREATE VIEW mgr_v OF mgr_vt UNDER emp_v INHERIT SELECT PRIVILEGES
  AS (SELECT mgr_vt(integer(oid)), name, room, dept FROM ONLY(mgr_a)
    UNION ALL
    (SELECT mgr_vt(integer(oid)), name, room, dept FROM ONLY(mgr_b))
    UNION ALL
    (SELECT mgr_vt(integer(oid)), name, room, dept FROM ONLY(mgr_c));
  CREATE VIEW student_v OF student_vt UNDER person_v
  INHERIT SELECT PRIVILEGES
    AS (SELECT student_vt(initeger(oid)), name, major FROM ONLY(student_a))
    UNION ALL
    (SELECT student_vt(integer(oid)), name, major FROM ONLY(student_d));

Next as described above, the object views are merged into one view hierarchy using case expressions for the typecode mapping as follows:
  CREATE VIEW person_vhier (typecode, oid, name, room, dept, major) AS
    (SELECT CASE WHEN typecode IN (person_tcode) THEN person_vcode
      WHEN typecode IN (emp_tcode) THEN emp_vcode
      WHEN typecode IN (mgr_tcode) THEN mgr_vcode
      WHEN typecode IN (student_tcode) THEN student_vcode
      END
    AS typecode, oid, name, room, dept, major
    FROM person_a_hier
  UNION ALL
    (SELECT CASE WHEN typecode IN (emp_tcode) THEN emp_vcode
      WHEN typecode IN (mgr_tcode) THEN mgr_vcode END
    AS typecode, oid, name, room, dept, NULL
    FROM emp_b_hier)
  UNION ALL
    (SELECT CASE WHEN typecode IN (mgr_tcode) THEN mgr_vcode END
    AS typecode, oid, name, room, dept, NULL
    FROM mgr_c_hier)
  UNION ALL
    (SELECT CASE WHEN typecode IN (student_tcode) THEN student_vcode
    END
    AS typecode, oid, name, NULL, NULL, major
    FROM student_d_hier);

The illustrated technique of pushing down the type-mapping into correlated sub-queries and the wrapping of the expressions in the select lists allows for overloading of the expressions in the view definitions. Inserts are possible if the definition of the sub-view body does not contain a UNION ALL operator. In the above example, this is the case only for the view person_v. The person_vcode occurs only in one case-expression and therefore is the only possible target of an insert into the view person_v. Similarly all possible targets for an update may be found. Since updates on the view emp_v can result in updates on emp_v and mgr_v (i.e. all of emp_v's sub-views), targets are all branches of the union containing emp_vcode or mgr_vcode. This information may also be used to find applicable check-constraints for insert and update and which triggers will need to be fired on the UDI query. In addition, the case-expressions together with the where-predicates of the logical view ranging over the hierarchy view person_vhier enhance "query rewrite" operations as will be described in more detail below.

Figure 4:
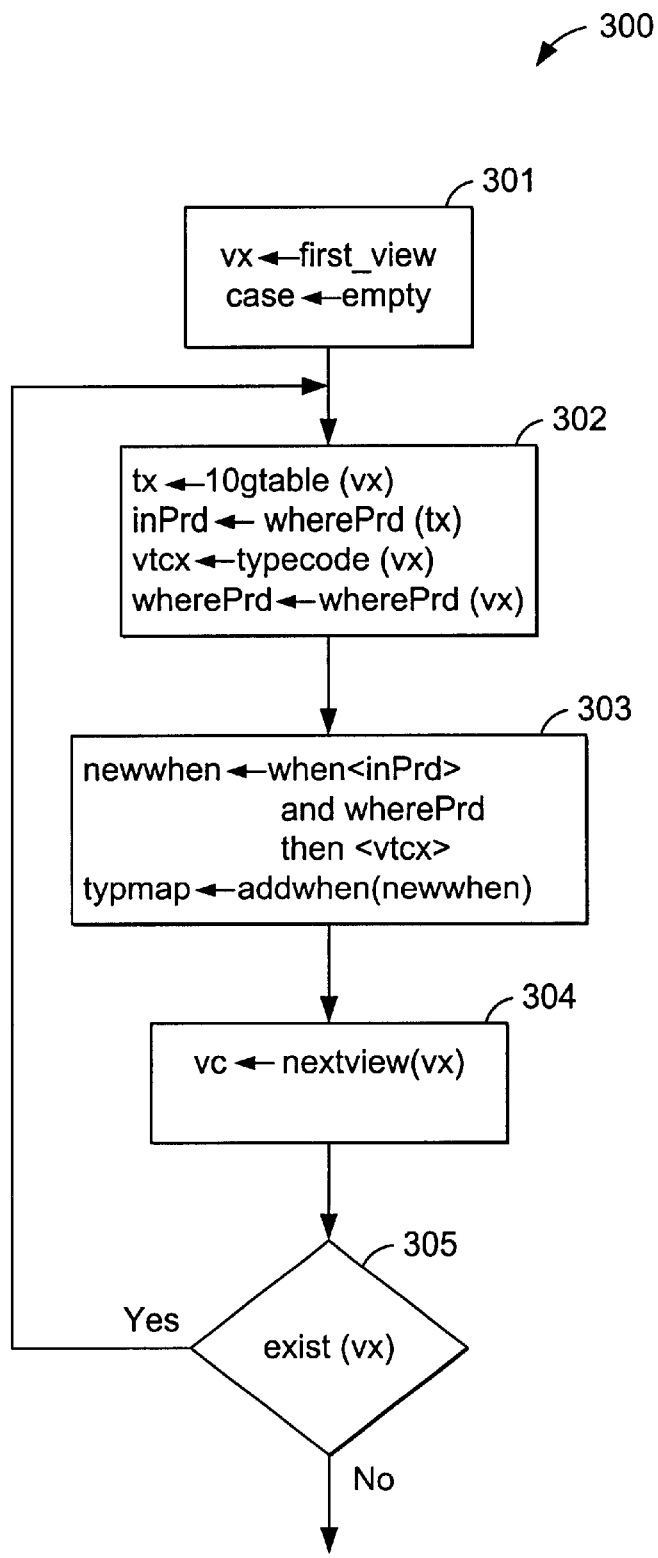
FIG. 4 shows in flow chart form a method for building a type map according to the present invention.
Figure 5:
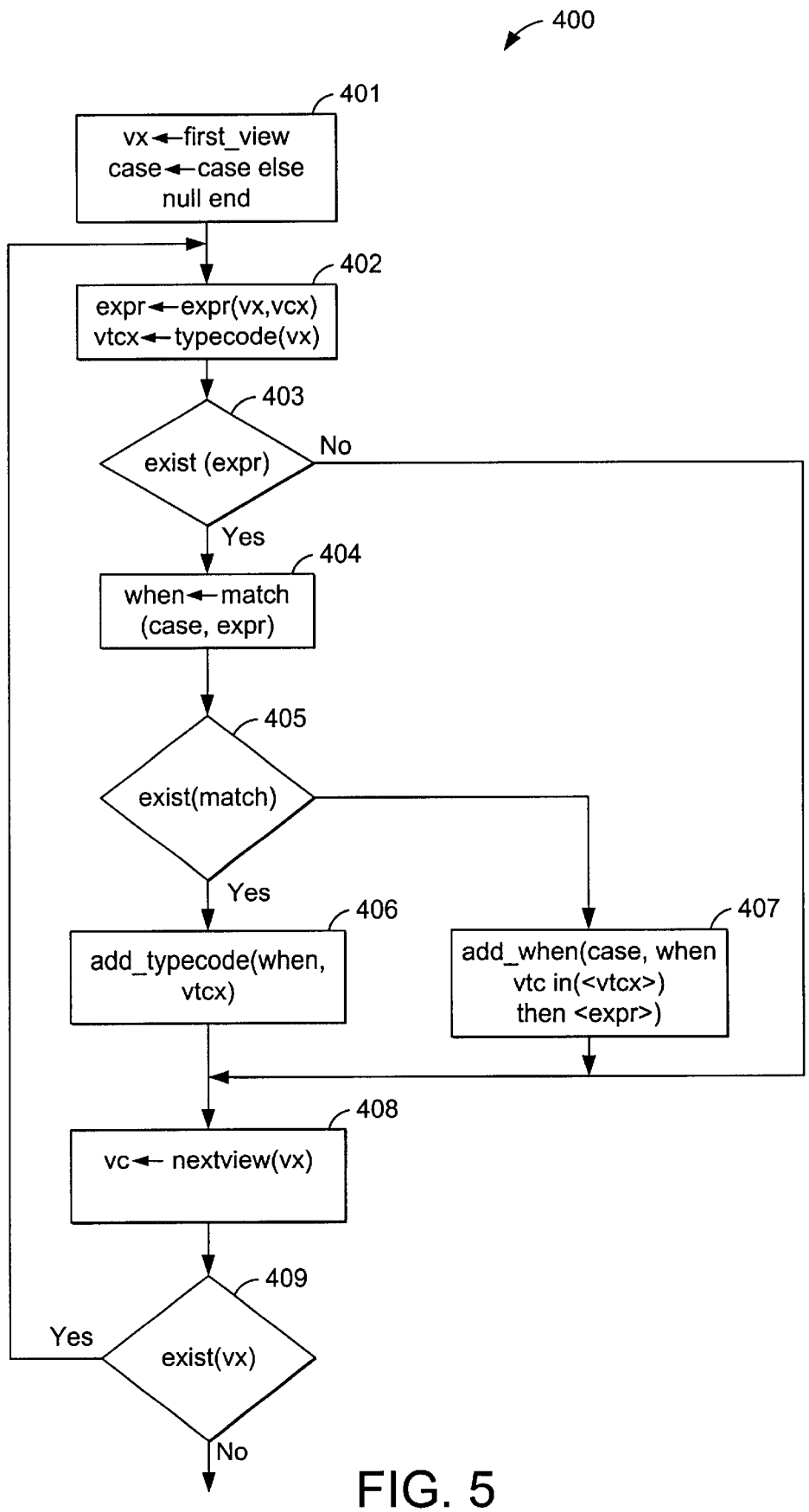
FIG. 5 shows in flowchart form a method for building a case expression in a select list according to another aspect of the present invention.
Figure 6:
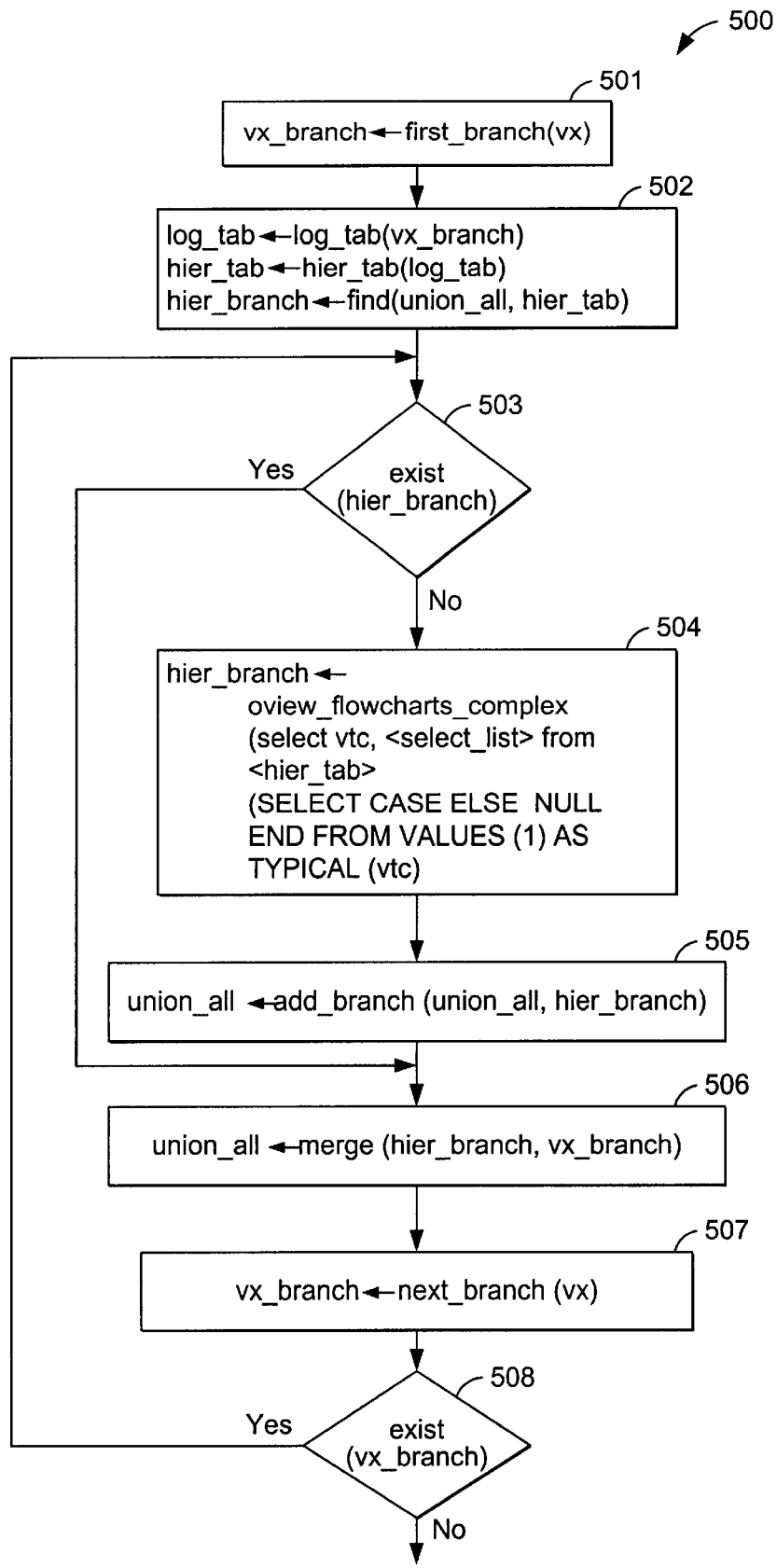
FIG. 6 shows in flowchart form a method for dispatching the user defined typed views to unified groups.

The following more general examples are now considered with reference to FIGS. 4 to 6.

For an object view hierarchy over a single table hierarchy, the user defines a table type hierarchy which takes the following general form:
  CREATE TYPE ttype1 AS (c11 INT, c12 INT) REF USING INT;
  CREATE TYPE ttype2 UNDER ttype1 AS (c21 INT, c22 INT);
  CREATE TYPE ttype3 UNDER ttype2 AS (c31 INT, c32);

```
CREATE TYPE ttype4 UNDER ttype1 AS (c41 INT,
   c42);
Next the user defines a table hierarchy as follows;
   CREATE TABLE t1 OF ttype1 (REF IS oid USER
      GENERATED);
   CREATE TABLE t2 OF ttype2 UNDER t1 INHERIT
      SELECT PRIVILEGES;
   CREATE TABLE t3 OF ttype3 UNDER t2 INHERIT
      SELECT PRIVILEGES;
   CREATE TABLE t4 OF ttype4 UNDER t1 INHERIT
      SELECT PRIVILEGES;
   Internally, the hierarchy table, t1_hier, is created in the
ORDBMS as follows:
   CREATE TABLE t1_hier (ttc INT, oid INT c11 INT, c12
      INT, c21 INT, c22 INT, c31 INT, c33 INT, c41 INT, c42
      INT);
   Next, the logical tables are created internally in the
ORDBMS as follows;
   CREATE VIEW "t1only_qtarget"
      AS SELECT ttype1(oid), c11, c12 FROM t12_hier
         WHERE ttc IN (<ttc1>);
   CREATE VIEW "t2only_qtarget"
      AS SELECT ttype2(oid), c11, c12, c21, c22
         WHERE ttc IN (<ttc1>);
   CREATE VIEW "t3only_qtarget"
      As SELECT ttype3(oid), c11, c12, c22, c31, c32
         FROM t1_hier
         WHERE ttc IN (<ttc3>);
   CREATE VIEW "t4only_qtarget,
AS SELECT ttype4(oid), c11, c12, c41, C42
         FROM t1_hier
         WHERE ttc IN (<ttc4>);
   For a single table hierarchy, the user creates a view
hierarchy having the following form:
   CREATE TYPE vtype1 AS (vc1 INT) REF USING INT;
   CREATE TYPE vtype2 UNDER vtype1 AS (vc2 INT);
   CREATE TYPE vtype3 UNDER vtype2 As (vc3 INT);
   CREATE TYPE vtype4 UNDER vtype1 AS (vc4 INT);
   CREATE VIEW v1 OF vtype1 (REF IS oid USER
      GENERATED)
      AS SELECT vtype1 (INT(oid)), c11
         FROM ONLY (t1)
         WHERE (c12>c11)
   CREATE VIEW v2 OF vtype2 UNDER v1 INHERIT
      SELECT PRIVILEGES
      AS SELECT vtype2 (INT(oid)), c11, c21
         FROM ONLY (t2)
         WHERE (c12>c22),
   CREATE VIEW v3 OF vtype3 UNDER v3 INHERIT
      SELECT PRIVILEGES
      AS SELECT vtype3 (INT(oid)), c11, c21, c31
         FROM ONLY (t3)
         WHERE (c12>c31):
   CREATE VIEW v4 OF vtype4 UNDER v1 INHERIT
      SELECT PRIVILEGES
      AS SELECT vtype4 (INT(oid)), c11, c41
         FROM ONLY (t4)
         WHERE (c42=5);
   In the ORDBMS, the hierarchy view is merged using
CASE expressions for mapping of types with WHERE
causes in views as follows:
   CREATE VIEW v1_hier
      AS SELECT vtc, oid, c1 as vc1, c21 as vc2, c31 as vc3,
         c41 as vc4
      FROM t1_hier,
         (SELECT CASE WHEN t1_hier.ttc IN (<ttc1>)
            AND (C12>C11) THEN <vtc1>
            WHEN t1_hier.ttc IN (<ttc2>)
            AND (c12>c22) THEN <vtc2>
            WHEN t1_hier.ttc IN (<ttc3>)
            AND (c21>C31) THEN <vtc3>
            WHEN t1_hier.ttc IN (<ttc4>)
            AND (c42 =5) THEN <vtc4>
            ELSE NULL END FROM VALUES(1))
         AS typemap (vtc)
      WHERE vtc IS NOT NULL;
   The logical views are generated internally in the
ORDBMS as follows:
   CREATE VIEW "only(v1)"
      As SELECT vtype1(oid), vc1 FROM v1 hier
         WHERE vtc IN (<vtc1>);
   CREATE VIEW "only(v2)"
      AS SELECT vtype2(oid), vc1, vc2
         FROM v1_hier
         WHERE vtc IN (<vtc1>);
   CREATE VIEW "only(v3)"
      AS SELECT vtype3(oid), vc1, vc2, vc3
         FROM v1_hier
         WHERE vte IN (<vtc3>);
   CREATE VIEW "only(v4)"
      AS SELECT vtype4(oid), vc1, vc4
         FROM v1_hier
         WHERE vtc IN (<vtc4>);
```

Reference is also made to FIG. 4 which shows in flow-chart form a method for building a type map or "typemap" according to the present invention denoted generally by reference 300.

As shown in FIG. 4, the first step indicated by block 301 comprises getting the first view in the hierarchy and generating an empty case "CASE ELSE NULL END". The next step in building the type map in block 302 comprises the following operations. Getting the table specified in the view body's FROM statement. This table is a logical table and has an IN predicate which describes its type, for example,

```
   ONLY(empt)<==>type IN (<emp_type>)
   empt<=>
   type IN (<emp_type<, <mgr_type>)
```

The next operations in block 302 involve getting the type-code of the view and also the IN-predicate which describes the view (i.e. same principle as for a logical table). The next step in block 303 involves mapping the table type to the view type and comprises adding a new WHEN to the case expression:

```
   t1only_qtarget<==>ttc IN (<ttc1>)
   t1_qtarget<==>ttc IN (<ttc1>, <ttc2>, <ttc3>, <ttc4)
   and THEN
   WHEN ttc IN (<ttc>) AND (c12>c11) THEN <vtc1>
```

If there are other views, these steps are repeated (blocks 304 and 305), otherwise the type map is complete.

Next the merging of an object view hierarchy over a single table hierarchy using column overloading is described. The user creates a view type hierarchy having the following form:

```
   CREATE TYPE vtype1 AS (vc1 INT) REF USING INT;
   CREATE TYPE vtype2 UNDER vtype1 AS (vc2 INT);
   CREATE TYPE vtype3 UNDER vtype2 AS (vc3 INT);
   CREATE TYPE vtype4 UNDER vtype1 AS (vc4 INT);
   CREATE VIEW v1 OF vtype1 (REF IS oid USER
      GENERATED)
```

```
    AS SELECT vtype1(INT(oid)), c11
        FROM ONLY(t1)
    CREATE VIEW v2 OF vtype2 UNDER v1 INHERIT
        SELECT PRIVILEGES
        AS SELECT vtype2(INT(oid)), c11+c12, c21
            FROM ONLY(t2);
    CREATE VIEW v3 OF vtype3 UNDER v3 INHERIT
        SELECT PRIVILEGES
        AS SELECT vtype3(INT(oid)), c11, c21 +c31,
            c31-c32
            FROM ONLY(t3);
    CREATE VIEW v4 OF vtype4 UNDER v1 INHERIT
        SELECT PRIVILEGES
        AS SELECT vtype4(INT(oid)), c11*c42, c41
            FROM ONLY(t4);
Internally, the ORDBMS creates the following hierarchy
view:
    CREATE VIEW v1_hier
        AS SELECT vtc, oid,
            CASE WHEN vtc IN (<vtc1>, <vtc3>) THEN c11
                WHEN vtc IN (<vtc2>) THEN c11+c12
                WHEN vtc IN (<vtc4>) then c11+c42
                ELSE NULL END AS vc1,
            CASE WHEN vtc IN (<vtc2>) THEN c21
                WHEN vtc IN (<vtc3>) then c21+c31
                ELSE NULL END AS vc2,
            CASE WHEN vtc IN (<vtc3>) THEN c31-c32
                ELSE NML END AS vc3,
            CASE WHEN vtc IN (<vtc4>) THEN c41
                ELSE NULL END AS vc4,
        FROM t1_hier, (SELECT CASE . . . ) AS typemap
            (vtc)
        WHERE vtc IS NOT NULL;
```

Reference is now made to FIG. 5 which shows a method for building a case expression of column vcy in the select list of the hierarchy view described above. In FIG. 5, the method for building a case expression is denoted generally by reference 400.

As shown in FIG. 5, the first step (block 401) in the method for building a case expression 400 comprises generating an empty case starting with the first view, i.e. the root view. The next step in block 402 involves getting the expression making up the view-column vcy in the view definition at hand. It will be appreciated that not all columns in the view hierarchy are in all the views, e.g. an emp will not have a bonus-column. Next, a check is made in block 403 to determine if an expression exists for this view. if an expression exists for vcy, then in block 404 a search is made to find the expression in the WHEN <pred> THEN <expr> branches of the case expression. If the expression is found (block 405), then only the typecode of this view is added to the IN-predicate of the found WHEN (block 406). Otherwise, there is "column overloading". The expression is new and gets its own WHEN branch in the CASE expression (block 407). These steps are repeated for all the views (blocks 408 and 409).

As described above, the present invention is also applicable to multiple underlying table hierarchies, as will now be generalized with reference to the following example and FIG. 6. The user creates the following table type and table hierarchies:

```
    CREATE TYPE ttype1 AS (c11 INT, c12 INT) REF
        USING INT;
    CREATE TYPE ttype2 UNDER ttype1 AS (c21 INT, c22
        INT);
    CREATE TYPE ttype3 UNDER ttype2 AS (c31 INT,
        c32);
    CREATE TYPE ttype4 UNDER ttype1 AS (c41 INT,
        c42);
    CREATE TABLE t1a OF ttype1 (REF IS oid USER
        GENERATED);
    CREATE TABLE t2a OF ttype2 UNDER t1a INHERIT
        SELECT PRIVILEGES;
    CREATE TABLE t4a OF ttype4 UNDER t1a INHERIT
        SELECT PRIVILEGES;
    CREATE TABLE t2b OF ttype2 (REF IS oid USER
        GENERATED);
    CREATE TABLE t3b OF ttype3 UNDER t2b INHERIT
        SELECT PRIVILEGES;
```
Internally, the following hierarchy table is created by the ORDBMS:
```
    CREATE TABLE t1a_hier (ttc INT, oid INT c11 INT,
        c12 INT, c21 INT, c22 INT, c41 INT, C42 INT);
    CREATE TABLE t2b_hier (ttc INT, oid INT c11 INT,
        c12 INT, c21 INT, c22 INT, c31 INT, C33 INT);
Internally, the following logical tables are also created;
    CREATE VIEW "t1a_qtarget"
        AS SELECT ttype1(oid), c11, c12 FROM t1a_hier
            WHERE ttc IN (<ttc1>);
    CREATE VIEW "onlyt2a_qtarget"
        AS SELECT ttype2(oid), c11, c12, c21, c22
            FROM t1a_hier
            WHERE ttc IN (<ttc1>);
    CREATE VIEW "t4a_qtarget"
        AS SELECT ttype4(oid), c11, c12, c41, c42
            FROM t1a_hier
            WHERE ttc IN (<ttc4>);
    CREATE VIEW "t2b_qtarget"
        AS SELECT ttype2(oid), c11, c12, c21, c22
            FROM t1b_hier
            WHERE ttc IN (<ttc1>);
    CREATE VIEW "t3b_qtarget"
        AS SELECT ttype3(oid), c11, c12, c21, c22, c31, c32
            FROM t1b_hier
            WHERE ttc IN (<ttc3>);:
```
For an object view hierarchy spanning both table hierarchies, the user creates a view hierarchy having the following form:
```
    CREATE TYPE vtype1 AS (vc1 INT) REF USING INT;
    CREATE TYPE vtype2 UNDER vtype1 AS (vc2 INT);
    CREATE TYPE vtype3 UNDER vtype2 AS (vc3 INT);
    CREATE TYPE vtype4 UNDER vtype1 AS (vc4 INT);
    CREATE VIEW v1 OF vtype1 (REP IS oid USER
        GENERATED)
        AS SELECT vtype1(INT(oid)), c11
            FROM ONLY (t1a)
            WHERE (c12>c11),
    CREATE VIEW v2 OF vtype2 UNDER v1 INHERIT
        SELECT PRIVILEGES
        AS (SELECT vtype2(INT(oid)), c11, c21
            FROM ONLY(t2a))
        UNION ALL
        (SELECT vtype2(INT(oid)), c11, c21
            FROM ONLY(t2b));
    CREATE VIEW v3 OF vtype3 UNDER v3 INHERIT
        SELECT PRIVILEGES
        AS SELECT vtype3(INT(oid)), c11, c21, c31
            FROM ONLY (t3b);
    CREATE VIEW v4 OF vtype4 UNDER v1 INHERIT
        SELECT PRIVILEGES
```

```
AS SELECT vtype4(INT(oid)), c11, c41
    FROM ONLY (t4a);
Internally, the following hierarchy view is created:
CREATE VIEW v1_hier
    AS (SELECT vtc, oid, c11 as vc1, c21 as vc2,
        NULL as vc3, c41 as vc4
    FROM t1a_hier,
        (SELECT CASE WHEN t1a_hier.ttc IN (<ttc1>)
            WHEN t1a_hier.ttc IN (<ttc2>)
            THEN <vtc2>)
            WHEN t1a_hier.ttc IN (<ttc4>)
            THEN (<vtc4>)
            ELSE NULL END FROM VALUES(1))
        AS typemap (vtc)
    WHERE vtc IS NOT NULL)
UNION ALL
    (SELECT vtc, oid, c11 as vc1, c21 as vc2,
        c31 as vc3, NULL as vc4
    FROM t2b_hier,
        (SELECT CASE WHEN t2b_hier.ttc IN (<ttc2>)
            THEN <vtc2>
            WHEN t2b_hier.ttc IN (<ttc3>)
            THEN <vtc3>)
            ELSE NULL END FROM VALUES(1))
        AS typemap (vtc)
    WHERE vtc IS NOT NULL);
Internally, the following logical views are also created;
CREATE VIEW "only (v1)"
    AS SELECT vtype oid), vc1 FROM v1_hier
        WHERE vtc IN (<vtc1>);
CREATE VIEW "only(v2)"
    AS SELECT vtype2(oid), vc1, vc2
        FROM v1_hier
        WHERE vtc IN (<vtc1>);
CREATE VIEW "only(v3)"
    AS SELECT vtype3(oid), vc1, vc2, vc3
        FROM v1_hier
        WHERE vtc IN (<vtc3>);
CREATE VIEW "only(v4)"
    AS SELECT vtype4(oid), vc1, vc4
        FROM v1_hier
        WHERE vtc IN (<vtc4>);
```

Reference is made to FIG. 6 which shows in flowchart form a method for dispatching the views over hierarchy branches according to this aspect of the present invention.

As shown in FIG. 6, the first step indicated by block 501 comprises getting the first SELECT branch of the UNION ALL in the body of the current view. The next step indicated by block 502 involves the following operations: finding first the logical table in the FROM clause of the SELECT-branch; then getting the hierarchy table that the logical table belongs to; and getting the branch in the expanded hierarchy view that ranges over the hierarchy table. The next step in block 503 involves determining if a branch in the hierarchy view exists. If a branch does not exist, then a new branch is created in the hierarchy view with the hierarchy table in the FROM and an empty type-mapping as shown in block 504. Next in block 505, the new branch is added to the UNION ALL of the hierarchy view. If a branch in the hierarchy view exists (block 503), then the steps in blocks 504 and 505 are bypassed. Next in block 506, the SELECT in the view body is merged into the found or created branch in the hierarchy view. The next step in block 507 involves getting the next SELECT branch in the body of the current view If another SELECT branch exists (block 508), then the above merging steps are repeated, otherwise the merging is complete.

In the operation of the ORDBMS, the query rewrite phase can simplify the query graph by determining branches which do not contain information for the query and also allows the exploitation of indexes in the underlying hierarchy table. This reduces locking and increases query performance in the ORDRMS. The query rewrite simplifies the case-expressions by applying known general rules which minimize the query graph to the nearly optimal case by eliminating the case-expressions and using the resulting predicates to drop the non-accessed table hierarchy from the graph.

The multi-table hierarchy example from above is used to illustrate the query rewrite phase.

```
CREATE VIEW person_v OF person_vt (REP IS oid
    USER GENERATED)
    AS SELECT person_v(integer(oid), name FROM
        ONLY(person_a);
CREATE VIEW emp_v OF emp_vt UNDER person_v
    INHERIT SELECT PRIVILEGES
    AS (SELECT emp_v(integer(oid), name, room FROM
        ONLY(emp_a))
    UNION ALL
        (SELECT emp_v(integer(oid), name, room FROM
        ONLY(emp_b))
```

The user invokes the following query:

```
SELECT oid, name FROM only(person_v) WHERE
    name='Smith';
```

According to the present invention, the full expanded query including the hierarchy view is as follows (for clarity only the used columns are shown):

```
SELECT oid FROM person_v_only_qtarget WHERE
    name='Smith";
person_v_only_qtarget:
SELECT person_vt(oid), name FROM person_vhier
    WHERE vtc IN (<person_vtc>);
person_vhier;
(SELECT map_a.vtc, oid,
    CASE WHEN map_a.vtc IN (<person_vtc>, <emp_
        vtc>)
    THEN name ELSE NULL END,
FROM person_a_hier, mappa(person_a_
    hier.typecode))
UNION ALL
(SELECT map_b.vtc, oid,
    CASE WHEN map_a.vtc IN (<emp_vtc>) THEN
        name ELSE NULL END,
FROM emp_b_hier, map_b (emp_b_hier.typecode));
mappa(person_a_hier.typecode):
SELECT CASE WHEN typecode IN (<person_ttc>)
    THEN <person_vtc>
    WHEN typecode IN (<emp_ttc) THEN <emp_vtc)
    ELSE NULL END AS vtc FROM VALUES(1);
map_b(emp_b_hier.typecode);
SELECT CASE WHEN typecode IN (<emp_ttc) THEN
    <emp_vtc)
    ELSE NULL END AS vtc FROM VALUES(1);
```

Step 1: Merge the selects together and push them through the UNION ALL operator:

```
(SELECT person_vt(oid),
    CASE WHEN map_a.vtc IN (<person_vtc>, <emp_
        vtc>)
    THEN name ELSE NULL END,
FROM person_a_hier, mapa(person_a_hier.typecode)
WHERE map_a.vtc IN (<person_vtc>) AND
```

```
    (CASE WHEN map_a.vtc IN (<person_vtc>, <emp_
       vtc>)
       THEN name ELSE NULL END='Smith'))
UNION ALL
(SELECT person_vt(oid),
    CASE WHEN map_a.vtc IN (<emp_vtc>) THEN
       name ELSE NULL END,
    FROM emp_b_hier, map_b(emp_b_hier.typecode)
    WHERE map_a.vtc IN (<person_vtc>) AND
       (CASE WHEN map_a.vtc IN (<person_vtc>, <emp_
       vtc>)
       THEN name ELSE NULL END='Smith'));
```

Step 2: Simplify the case wrapper that was pulled into the where-clause. The WHERE clause claims that map_a.vtc must be <person_vtc>. So the case can be dropped and replaced by the qualifying when-branches expression. If several when predicates would qualify a list OR'ed predicates is generated. If none qualify (as in the second branch of the example) a FALSE is generated. The case wrappers can also be simplified in this example.

```
    (SELECT person_vt(oid), name,
       FROM person_a_hier, mapa(person_a_
          hier.typecode)
       WHERE map_a.vtc IN (<person_vtc>) AND name=
          'Smith')
    UNION ALL
    (SELECT person_vt(oid), NULL,
       FROM emp_b_hier, map_b(emp_b_hier.typecode)
       WHERE map_a.vtc IN (<person_vtc>) AND FALSE;
```

Step 3: Theorem prover and dropping of branches. The second WHERE clause is FALSE, so the branch of the UNION ALL can be dropped. A UNION ALL with only one branch is a trivial operation and can be omitted

```
    SELECT person_vt(oid), name,
       FROM person_a_hier, mapa(person_a_
          hier.typecode)
       WHERE map_a.vtc IN (<person_vtc>) AND name=
          'Smith';
```

Step 4: Pull up the correlated subquery

```
    SELECT person_vt(oid), name,
       FROM person_a_hier, VALUES(1)
       WHERE CASE WHEN typecode IN (<person_ttc>)
          THEN <person_vtc>
          WHEN typecode IN (<emp_ttc) THEN <emp_vtc)
       A ELSE NULL END IN (<person_vtc>) AND name=
          'Smith';
```

Step 5: Simplify the case expression in the WHERE clauses
The outer IN predicate can only be true if the case expression resolves to it. Therefore the "typecode IN (<person_ttc>)" must be true to succeed. So the whole predicate can be replaced by the when predicate. If multiple possibilities exist (multiple values in the IN-list), the when-predicates are OR'ed.

```
    SELECT person_vt(oid), name,
       FROM person_a_hier, VALUES(1)
       WHERE typecode IN (<person_ttc>) AND name=
          'Smith';
          If an index on typecode or: name exists it can be
             exploited since it is ranging immediately over the
             physical table. Also check-constraints on name
             can help to validate if 'Smith' can be in the table
             at all.
```

If the branches do not drop away as easily as in this example, e.g. doing a select on the whole hierarchy for a specific oid, then the ORDBMS can still exploit information it may have on the content of the single branches. For example, the definition of range constraints for the oid's in each table hierarchy would cause query rewrite again to drop branches that are out of range for the required oid. The dropping of these branches becomes especially important in an environment that joins different data sources with either lots of interface overhead or a slower connection to a remote data source. Advantageously, the present invention minimizes the access and provides a complete encapsulation of the underlying relational groundwork.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claim is:

1. In a relational database management system, a method for creating a hierarchy view on top of a table hierarchy, comprising:
    (a) storing a user definition for a table hierarchy and a table type hierarchy, wherein the table hierarchy includes a physical table storing all columns of one or more typed tables in the table type hierarchy; and
    (b) generating a hierarchy view from the table hierarchy and table type hierarchy, wherein the hierarchy view comprises a single unified view on the table hierarchy comprised of one or more logical views for each of the typed tables in the table type hierarchy.

2. The method as claimed in claim 1, wherein the hierarchy view is shareable by one or more query targets.

3. The method as claimed in claim 2, wherein said step (b) of generating a hierarchy view comprises merging the logical views specified in a view type hierarchy into a case expression for type mapping of rows read from the table hierarchy.

4. The method as claimed in claim 3, further including the step of using a case expression in a select list to unify expressions in the select list of a logical view in the view type hierarchy.

5. The method as claimed in claim 1, wherein more than one table hierarchy is stored, and further including the steps of generating a hierarchy view for each of the table hierarchies and grouping the hierarchy views according to the underlying table hierarchies.

6. The method as claimed in claim 1, wherein logical views are used as query targets for accessing the hierarchy view.

7. The method as claimed in claim 3, wherein said step of merging the logical views into a case expression comprises (i) generating an empty case for a first view in the view type hierarchy, (ii) determining if an expression exists for columns in the first view, (iii) if the expression exists, then adding a typecode for the first view to a corresponding branch in the case expression, (iv) if the expression does not exist, then adding a new branch for the columns, and (v) repeating steps (ii) to (iv) for other logical views.

8. A computer program product for use on a computer wherein queries are entered for retrieving data from tables stored in memory and wherein means are included for defining a table hierarchy for retrieving data from the tables, said computer program product comprising:
    a recording medium;
    means recorded on said medium for instructing said computer to perform the steps of, (a) storing a user definition for a table hierarchy and a table type hierarchy, wherein the table hierarchy includes a physical table storing all columns of one or more typed tables in the table type hierarchy; and (b) generating a hierarchy view from the table hierarchy and table type hierarchy, wherein the hierarchy view comprises a single unified view on the table hierarchy comprised of one or more logical views for each of the typed tables in the table type hierarchy.

9. The computer program product as claimed in claim 8, wherein the hierarchy view is shareable by one or more query targets.

10. The computer program product as claimed in claim 9, wherein said step (b) of generating a hierarchy view comprises merging the logical views specified in a view type hierarchy into a case expression for type mapping of rows read from the table hierarchy.

11. The computer program product as claimed in claim 10, further including the step of using a case expression in a select list to unify expressions in the select list of a logical view in the view type hierarchy.

12. The computer program product as claimed in claim 8, wherein more than one table hierarchy is stored, and further including the steps of generating a hierarchy view for each of the table hierarchies and grouping the hierarchy views according to the underlying table hierarchies.

13. The computer program product as claimed in claim 8, wherein logical views are used as query targets for accessing the hierarchy view.

14. The computer program product as claimed in claim 10, wherein said step of merging the logical views into a case expression comprises (i) generating an empty case for a first view in the view type hierarchy, (ii) determining if an expression exists for columns in the first view, (iii) if the expression exists, then adding a typecode for the first view to a corresponding branch in the case expression, (iv) if the expression does not exist, then adding a new branch for the columns, and (v) repeating steps (ii) to (iv) for other logical views.

15. A relational database management system for use with a computer system wherein queries are entered for retrieving data from tables and wherein means are included for defining a table hierarchy for retrieving data from the tables, said system comprising:

(a) means for receiving a user definition for a table hierarchy and a table type hierarchy, wherein the table hierarchy includes a physical table storing all columns of one or more typed tables in the table type hierarchy; and (b) means for generating a hierarchy view from the table hierarchy and the table type hierarchy, wherein the hierarchy view comprises a single unified view on the table hierarchy comprised of one or more logical views for each of the typed tables in table type hierarchy.

16. The relational database management system as claimed in claim 15, wherein the hierarchy view is shareable by one or more query targets.

17. The relational database management system as claimed in claim 16, wherein said means for generating include means for merging the views specified in a view type hierarchy into a case expression for type mapping of rows read from the table hierarchy.

18. The method as claimed in claim 2, wherein more than one table hierarchy is stored, and further including the steps of generating a hierarchy view for each of the table hierarchies and grouping the hierarchy views according to the underlying table hierarchies.

19. The method as claimed in claim 2, wherein logical views are used as query targets for accessing the hierarchy view.

* * * * *

UNITED STATES PATENT AND TRADEMARK OFFICE
CERTIFICATE OF CORRECTION

PATENT NO.    : 6,421,658 B1
DATED         : July 16, 2002
INVENTOR(S)   : Michael J. Carey et al.

It is certified that error appears in the above-identified patent and that said Letters Patent is hereby corrected as shown below:

<u>Title page,</u>
Item [57], ABSTRACT,
Line 2, "(OPDBMS)" should read -- (ORDBMS) --

Signed and Sealed this

Eighth Day of April, 2003

JAMES E. ROGAN
*Director of the United States Patent and Trademark Office*